No. 618,103. Patented Jan. 24, 1899.
P. H. KASPER & F. J. SCHOEPKE.
MACHINE FOR CUTTING MILK CURDS.
(Application filed Apr. 23, 1898.)
(No Model.)
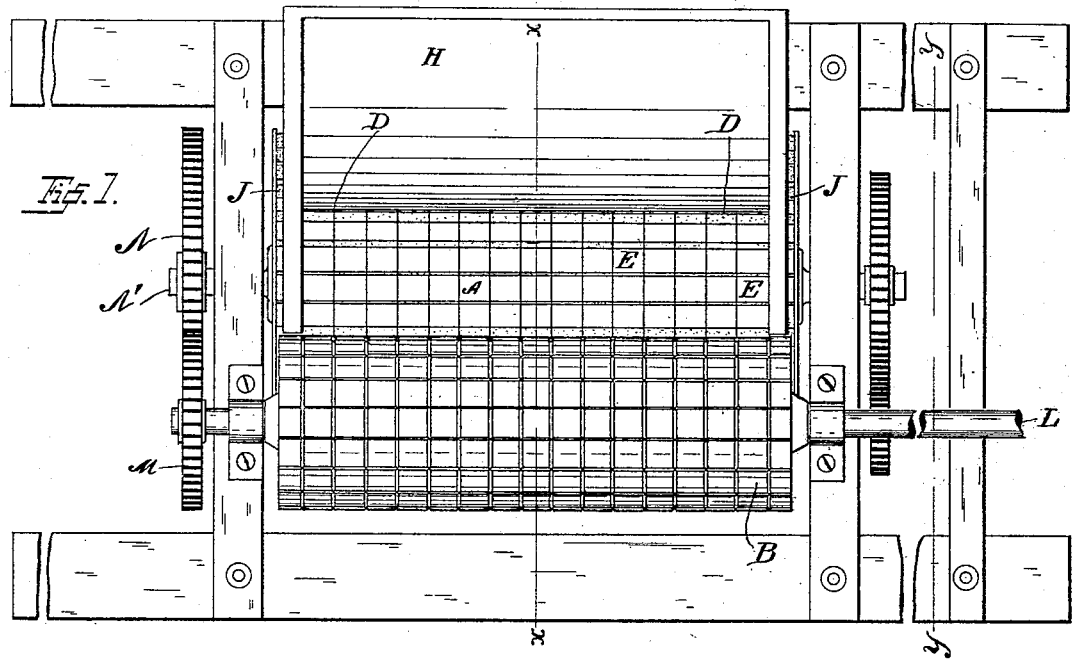
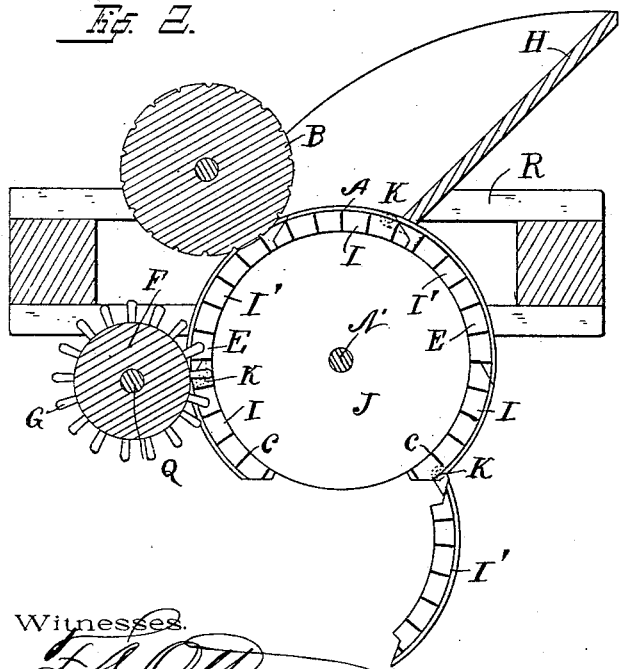
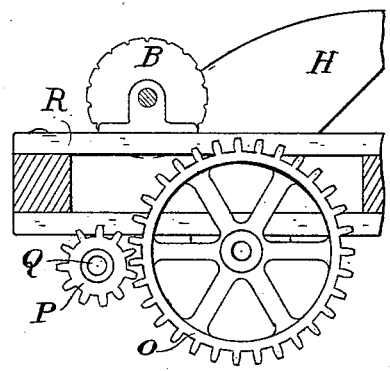
Witnesses.
Inventors
Philip H Kasper
Fred J Schoepke
By Erwin Wheeler & Wheeler
Attorneys.
THE NORRIS PETERS CO., PHOTO-LITHO., WASHINGTON, D. C.

UNITED STATES PATENT OFFICE.

PHILIP H. KASPER AND FRED J. SCHOEPKE, OF BEAR CREEK, WISCONSIN.

MACHINE FOR CUTTING MILK-CURDS.

SPECIFICATION forming part of Letters Patent No. 618,103, dated January 24, 1899.

Application filed April 23, 1898. Serial No. 678,680. (No model.)

*To all whom it may concern:*

Be it known that we, PHILIP H. KASPER and FRED J. SCHOEPKE, citizens of the United States, residing at Bear Creek, in the county of Waupaca and State of Wisconsin, have invented new and useful Improvements in Machines for Cutting Milk-Curds, of which the following is a specification.

Our invention relates to improvements in machines for cutting and separating milk-curds into small uniform pieces preparatory to manufacturing the same into cheese.

The construction of our invention is explained by reference to the accompanying drawings, in which—

Figure 1 represents a top view. Fig. 2 is a vertical section drawn on line X X of Fig. 1. Fig 3 is also a vertical section drawn on line Y Y of Fig. 1.

Like parts are identified by the same reference-letters throughout the several views.

A represents a rotary cutting-cylinder by which the curd is severed into uniform pieces as it is passed forward by the rotation of such cylinder between it and the bearing-cylinder B. The cylinder A is formed of a series of horizontal blades C and a series of transversely-arranged circular blades D, which blades are secured together at their points of contact and at their respective ends, thus forming rectangular spaces E, through which the curd is forced from the exterior to the interior of the cylinder as it is fed forward between such cutting-cylinder and the bearing-roller B. To provide for disengaging the pieces of curd that do not drop of their own gravity from between the cutting-knives, a cylinder F is provided, having upon its surface numerous projections G, arranged to mesh or register with the respective rectangular spaces E of the cutting-cylinder, whereby as such cylinder is rotated the curd remaining between the knives is forced therefrom by the projections G into the interior of the cylinder.

H is a hopper upon which the curd is supported and fed forward between the cutting and bearing cylinders. To provide for the escape of the curd as it is being cut and subdivided, as stated, the knives of the cylinder are secured together, forming several separate stationary sections I and swinging sections I', which swinging sections are respectively secured at one side to the ends J J of the cylinder by hinges K, which hinges permit such sections I' to drop of their own gravity as said cylinder rotates, as indicated in Fig. 2, and whereby the contents of the cylinder are permitted to escape.

Motion is communicated, primarily, to the shaft L of the bearing-roller B by means of a crank, belt, or in any ordinary manner. Motion is communicated from the shaft L to the cutting-cylinder A through the pinion M, gear N, and shaft N'. Motion is communicated from the shaft L to the cylinder F through the gear O, pinion P, and shaft Q.

The several cylinders, with their respective shafts, are supported from the frame R, which is preferably made of wood and secured together by bolts or in any convenient manner. The frame R is preferably made of such length as will conveniently support the cutting mechanism described across the walls of a cheese-vat.

It is obvious that as the cylinder A rotates the swinging sections I', which have dropped open, will be caused to swing back of their own gravity into their closed position and will thus remain until they reach the lowest point of rotation, when they drop open again, as stated, of their own gravity. It is also obvious that with this device the curd passing between the cutting and bearing cylinders will be severed into uniform pieces of any desired size and that the work may be much more rapidly done than by the ordinary crushing-cylinders or by reciprocating chopping-knives heretofore used.

Having thus described our invention, what we claim as new, and desire to secure by Letters Patent, is—

1. In a machine for cutting milk-curds, the combination of a hollow rotary cutting-cylinder mounted upon a supporting-shaft, a parallel feed or pressure cylinder, adapted to rotate in contact with the surface of said cutting-cylinder and force the curd between the cutting-knives into the interior of said cutting-cylinder; and means for communicating motion from the driving-shaft to said feed and cutting cylinder, substantially as and for the purpose set forth.

2. In a machine for cutting milk-curds, the combination of a hollow rotary cutting-cylinder, a supporting-shaft for said cylinder; a parallel feed or pressure cylinder adapted to rotate in contact with the surface of said cutting-cylinder and force the curds between and against the cutting-knives of such cylinder into its interior, a bearing-cylinder provided with projecting prongs adapted to register with and mesh into the spaces between the knives of the cutting-cylinder and disengage the curd suspended therein, and means for communicating motion from said primary driving-shaft to the several cylinders, said cutting-cylinder being provided with a discharge opening or openings for the escape of the curd, all substantially as and for the purpose set forth.

3. In a machine for cutting milk-curds, the combination of a rotary cutting-cylinder, consisting of series of horizontal and circular blades arranged at right angles to each other, and secured together in separate stationary and swinging sections; a parallel feed or pressure cylinder adapted to rotate in contact with the surface of said cutting-cylinder and force the curds against and between the cutting-knives of such cylinder, into its interior; a hopper for supporting and conveying the curd to said cutting and feed cylinders; a bearing-cylinder provided with projecting pins adapted to register with and mesh into the spaces between the blades of the cutting-cylinder and disengage the cut curd suspended thereon, a main driving-shaft supporting one of said cylinders, and means for communicating motion from said driving-shaft to the supporting-shafts of the other two cylinders, all substantially as and for the purpose set forth.

In testimony whereof we have hereunto set our hands this 8th day of April, 1898.

PHILIP H. KASPER.
FRED J. SCHOEPKE.

Witnesses:
   JAS. B. ERWIN,
   WM. JAEGER.